US012600061B2

(12) United States Patent
Ito et al.

(10) Patent No.:  US 12,600,061 B2
(45) Date of Patent:  Apr. 14, 2026

(54) APPARATUS FOR MANUFACTURING RESIN MOLDED PRODUCT

(71) Applicant: TOYOTA BOSHOKU KABUSHIKI KAISHA, Aichi-ken (JP)

(72) Inventors: Yuto Ito, Takahama (JP); Yuki Wakimoto, Nagoya (JP); Rikiya Suenaga, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 201 days.

(21) Appl. No.: 18/426,787

(22) Filed: Jan. 30, 2024

(65) Prior Publication Data

US 2024/0262015 A1      Aug. 8, 2024

(30) Foreign Application Priority Data

Feb. 2, 2023    (JP) ................................. 2023-014550

(51) Int. Cl.
B29C 33/00          (2006.01)
B29C 33/16          (2006.01)
(Continued)

(52) U.S. Cl.
CPC .............. B29C 33/16 (2013.01); B29C 70/72 (2013.01); *B29C 33/00* (2013.01); *B29C 33/12* (2013.01);
(Continued)

(58) Field of Classification Search
CPC ......... B29C 33/16; B29C 70/72; B29C 33/00; B29C 45/14065; B29C 2045/14163; B29C 45/14008; B29C 70/00; B29C 33/12
See application file for complete search history.

(56) References Cited

U.S. PATENT DOCUMENTS 2,424,235 A * 7/1947 Hoffer ..................... B29C 45/26
                                                             249/102
4,455,274 A * 6/1984 Horney ............. B29C 45/14065
                                                             264/277
(Continued)

FOREIGN PATENT DOCUMENTS

JP            H0885124 A  *  4/1996  ......... B29C 43/3607
JP            H091572 A  *  1/1997
(Continued)

OTHER PUBLICATIONS

JP-H091572-A (Komada ) Jan. 1997 (online machine translation), [Retrieved on Aug. 1, 2025]. Retrieved from: Espacenet (Year: 1997).*

(Continued)

*Primary Examiner* — JaMel M Nelson
*Assistant Examiner* — Andres E. Behrens, Jr.
(74) *Attorney, Agent, or Firm* — GREENBLUM & BERNSTEIN, P.L.C.

(57)          ABSTRACT

An apparatus for manufacturing a resin molded product is configured to manufacture a resin molded product into which an elongated member is inserted. The apparatus for manufacturing the resin molded product includes a first mold having a first molding surface, and a second mold having a second molding surface. The first mold includes a protrusion. The protrusion protrudes from the first molding surface toward the second molding surface. The protrusion includes an end surface configured to come into contact with part of a first end surface of the elongated member. The second mold includes an accommodating recess, a holding portion disposed in the accommodating recess and configured to hold the elongated member with the protrusion, and a biasing member that is disposed in the accommodating (Continued)

recess and biases the holding portion toward the first molding surface.

5 Claims, 3 Drawing Sheets

(51) Int. Cl.

| | |
|---|---|
| *B29C 70/00* | (2006.01) |
| *B29C 70/72* | (2006.01) |
| *B29C 33/12* | (2006.01) |
| *B29C 45/14* | (2006.01) |

(52) U.S. Cl.
  CPC .. *B29C 45/14008* (2013.01); *B29C 45/14065* (2013.01); *B29C 2045/14163* (2013.01); *B29C 70/00* (2013.01)

(56) References Cited

U.S. PATENT DOCUMENTS

| | | | | |
|---|---|---|---|---|
| 5,137,076 A * | 8/1992 | Takahashi | .............. | B22D 17/24 |
| | | | | 164/320 |
| 5,560,939 A * | 10/1996 | Nakagawa | .......... | B29C 45/2673 |
| | | | | 425/186 |
| 5,797,180 A * | 8/1998 | Buchholz | .......... | B29C 45/14598 |
| | | | | 74/567 |
| 5,849,237 A * | 12/1998 | Inoue | ................ | B29C 45/14073 |
| | | | | 425/444 |
| 8,562,889 B2 * | 10/2013 | Kuno | ........................ | F01M 9/10 |
| | | | | 264/328.12 |

| | | | | |
|---|---|---|---|---|
| 2002/0017360 A1 * | 2/2002 | Hiraiwa | ............ | B29C 45/14508 |
| | | | | 156/228 |
| 2010/0032080 A1 * | 2/2010 | Nilsrud | ............ | B29C 45/14508 |
| | | | | 156/216 |
| 2010/0104803 A1 * | 4/2010 | Nakagawa | ............... | B60J 1/006 |
| | | | | 264/261 |
| 2016/0059752 A1 | 3/2016 | Kishida et al. | | |
| 2018/0178424 A1 * | 6/2018 | Faik | .................... | B29C 45/2606 |
| 2019/0061206 A1 * | 2/2019 | Dahl | .................... | B29C 43/203 |
| 2019/0091906 A1 * | 3/2019 | Bopp | .................... | B29C 33/123 |
| 2021/0354351 A1 * | 11/2021 | Beverung | ......... | B29C 45/14073 |
| 2022/0048220 A1 * | 2/2022 | Legh | ....................... | B29C 44/02 |
| 2022/0347903 A1 * | 11/2022 | Lin | ..................... | B29C 45/2606 |
| 2023/0062429 A1 * | 3/2023 | Chen | ....................... | B29C 44/04 |

FOREIGN PATENT DOCUMENTS

| | | | | |
|---|---|---|---|---|
| JP | 2016-049801 | 4/2016 | | |
| WO | WO-9912720 A1 * | 3/1999 | ....... | B29C 45/14073 |
| WO | WO-0214048 A1 * | 2/2002 | ......... | B29C 45/1734 |

OTHER PUBLICATIONS

JP-H0885124-A (Makoto) Apr. 1996 (online machine translation), [Retrieved on Aug. 1, 2025]. Retrieved from: Espacenet (Year: 1996).*
https://web.archive.org/web/20220909033219/https://en.wikipedia.org/wiki/Gas_spring Wikipedia's Article on Gas Springs, 2022 (Year: 2022).*

* cited by examiner

APPARATUS FOR MANUFACTURING RESIN MOLDED PRODUCT

BACKGROUND

1. Field

The present disclosure relates to an apparatus for manufacturing a resin molded product.

2. Description of Related Art

Japanese Laid-Open Patent Publication No. 2016-49801 discloses a gearbox with a motor. The gearbox with the motor of this publication includes a resin gearbox case having a recess that accommodates a set of reduction gears. The gearbox also includes a cover plate that covers the recess. Bolt holes through which bolts are respectively inserted are disposed in the vicinity of an outer portion of the gearbox case. Each bolt has a head fitted into a corresponding bolt hole. The bolt has a shaft that protrudes from the surface of the gearbox case.

In the case of insert-molding of an elongated member (e.g., a bolt) in a resin molded product (e.g., a gearbox case), it is desired that the removal of the elongated member from the resin molded product be limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides an apparatus for manufacturing a resin molded product. The apparatus is configured to manufacture a resin molded product into which an elongated member is inserted. The apparatus includes a first mold having a first molding surface, and a second mold having a second molding surface that defines a cavity together with the first molding surface. The first mold includes a protrusion that protrudes from the first molding surface toward the second molding surface. The elongated member includes a first end surface and a second end surface in a longitudinal direction. The protrusion includes an end surface configured to come into contact with part of the first end surface. The second mold includes an accommodating recess that opens toward the first molding surface, a holding portion disposed in the accommodating recess and configured to hold the elongated member with the protrusion, and a biasing member that is disposed in the accommodating recess and biases the holding portion toward the first molding surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of an apparatus for manufacturing a resin molded product into which an elongated member is inserted will now be described with reference to FIGS. 1 to 4. In the present embodiment, the resin molded product into which the elongated member is inserted is a gearbox with a motor.

Resin Molded Product

Figure 1:
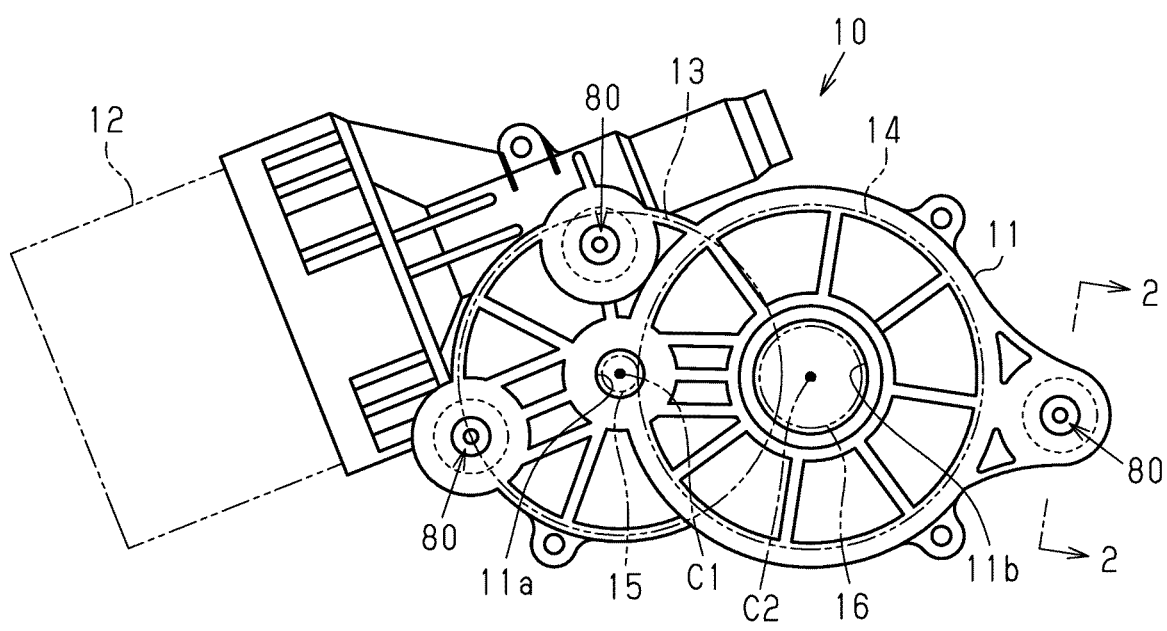
FIG. 1 is a side view of a resin molded product into which an elongated member according to an embodiment is inserted.

As shown in FIG. 1, a gearbox with a motor (hereinafter referred to as a resin molded product 10) includes a case 11, a motor 12 for attachment to the case 11, a first gear 13, a second gear 14, a first rotary shaft 15, a second rotary shaft 16, and bolts 80. Each bolt 80 is an example of the elongated member. The case 11 has a first support hole 11a and a second support hole 11b. The first rotary shaft 15 is rotationally supported by the first support hole 11a. The second rotary shaft 16 is rotationally supported by the second support hole 11b. The first gear 13 is accommodated in the case 11 and fixed to the first rotary shaft 15. The second gear 14 is accommodated in the case 11 and fixed to the second rotary shaft 16. The first gear 13 meshes with a gear portion (not shown) of a rotary shaft of the motor 12 and rotates about an axis C1 of the first rotary shaft 15. The second gear 14 meshes with the first gear 13 and rotates about an axis C2 of the second rotary shaft 16.

Bolt 80

As shown in FIG. 1, the bolts 80 used to attach the case 11 to a vehicle body (not shown) are embedded in the case 11. In the present embodiment, three bolts 80 are embedded in the case 11.

Figure 2:
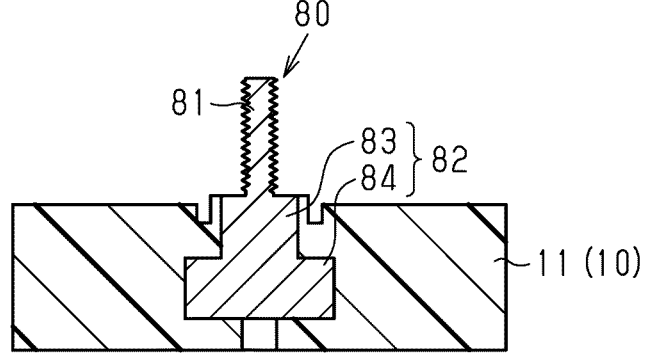
FIG. 2 is a cross-sectional view taken along line 2-2 in FIG. 1.

As shown in FIG. 2, the bolt 80 includes a shaft 81 and a head 82. The head 82 is coupled to an end of the shaft 81 and extends outward from the shaft 81. The shaft 81 has a columnar shape and is a male thread. The head 82 includes a first head portion 83 and a second head portion 84. The first head portion 83 and the second head portion 84 are columnar. The first head portion 83 is coupled to the end of the shaft 81. The second head portion 84 is coupled to the end of the first head portion 83 on the side opposite to the shaft 81. The first head portion 83 extends outward from the shaft 81 in the radial direction of the shaft 81. The second head portion 84 extends outward from the first head portion 83 in the radial direction of the shaft 81. The shaft 81 and the end of the first head portion 83 closer to the shaft 81 are exposed through the case 11. The second head portion 84 is held by resin from the opposite sides in the axial direction (vertical direction in FIG. 2) of the shaft 81. The axial direction of the shaft 81 corresponds to the longitudinal direction of the bolt 80.

The head 82 is preferably a magnetic body. In the present embodiment, the magnetic body is attracted to a magnet. A ferromagnetic body, upon exposure to an external magnetic field, becomes magnetized in the same direction as that field and maintains robust magnetism even after the external magnetic field is removed.

The other bolts 80 of the case 11 have the same structure. Henceforth, the description will focus on one bolt 80; the others will not be discussed.

Manufacturing Apparatus

The apparatus for manufacturing the case 11 (hereinafter referred to as a manufacturing apparatus 20) will now be described with reference to FIGS. 3 and 4.

Figure 3:
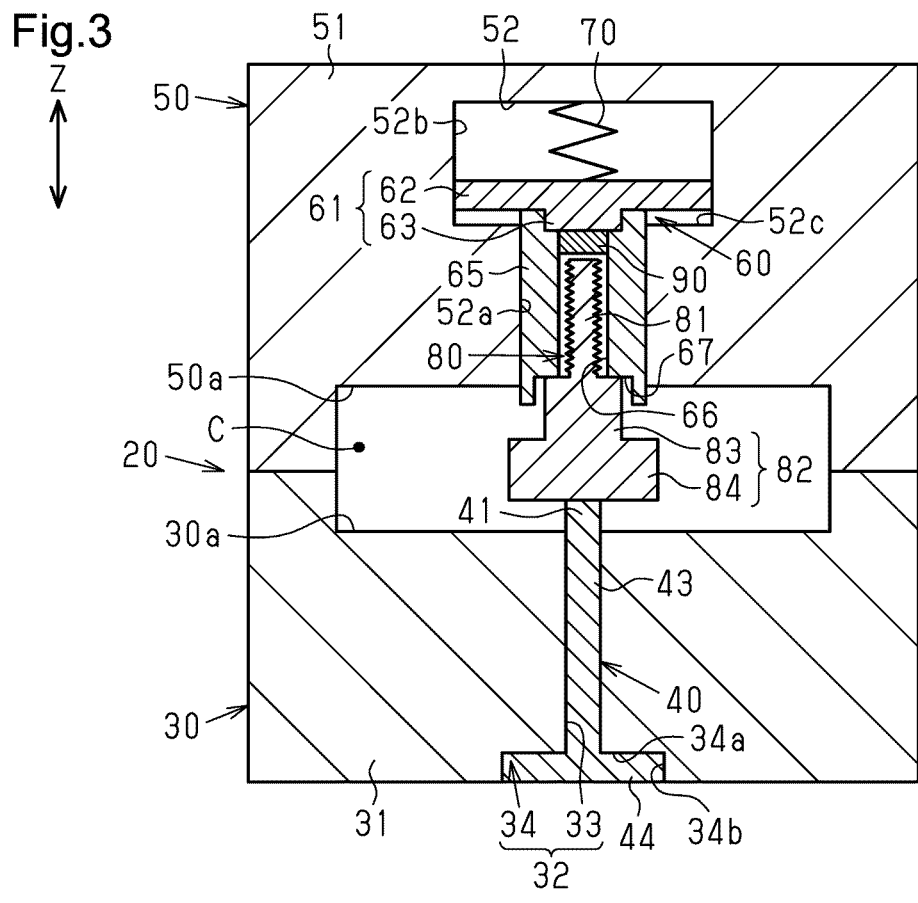
FIG. 3 is a cross-sectional view showing the apparatus for manufacturing the resin molded product of FIG. 1.

As shown in FIG. 3, the manufacturing apparatus 20 includes a lower mold 30 and an upper mold 50. The upper mold 50 is a fixed mold. The lower mold 30 is a movable mold located below the upper mold 50 (lower side in FIG. 3) and movable toward the upper mold 50. The lower mold 30 has a first molding surface 30a. The upper mold 50 has a second molding surface 50a. With the lower mold 30 and the upper mold 50 clamped, the second molding surface 50a defines the cavity C together with the first molding surface 30a.

The direction in which the upper mold 50 and the lower mold 30 are arranged will be hereinafter referred to as the vertical direction Z. The vertical direction Z coincides with a gravitational direction.

Upper Mold 50

As shown in FIG. 3, the upper mold 50 includes an upper mold body 51, a holding portion 60, and a biasing member 70. The upper mold body 51 has an accommodating recess 52 that opens toward the first molding surface 30a.

The accommodating recess 52 includes a first portion 52a that opens toward the first molding surface 30a, and a second portion 52b connected to the upper side of the first portion 52a. The second portion 52b extends outward from the first portion 52a. The inner surface of the first portion 52a and the inner surface of the second portion 52b are connected to each other by a step 52c.

The holding portion 60 is located in the accommodating recess 52. The holding portion 60 is movable relative to the upper mold body 51. The holding portion 60 includes a base 61 and a cylindrical portion 65. The base 61 includes a plate-shaped body 62 and a protrusion 63 that protrudes downward from the body 62. The body 62 is located in the second portion 52b of the accommodating recess 52. The body 62 is movable in the vertical direction Z in the second portion 52b. The body 62 slides along the inner surface of the accommodating recess 52. Thus, the movement of the body 62 in the vertical direction Z is guided by the inner surface of the accommodating recess 52. Downward movement of the body 62 is restricted by contact with the step 52c (see FIGS. 5 and 6).

The cylindrical portion 65 is located at a lower part of the base 61 and is inserted through the first portion 52a of the accommodating recess 52. The cylindrical portion 65 is preferably a ferromagnetic body. The cylindrical portion 65 is joined to the lower surface of the body 62 of the base 61. The cylindrical portion 65 has a cylindrical shape and is located inward from the outer edge of the body 62 in the radial direction of the cylindrical portion 65. The cylindrical portion 65 includes an insertion hole 66 and a step 67 connected to a lower part of the insertion hole 66. The insertion hole 66 opens toward the first molding surface 30a and is closed by the protrusion 63 on the side opposite to the opening. The shaft 81 of the bolt 80 is inserted into the insertion hole 66. The inner diameter of the cylindrical portion 65 is slightly larger than the diameter of the shaft 81 of the bolt 80. That is, there is a gap between the inner surface of the cylindrical portion 65 and the side surface of the shaft 81.

Figure 4:
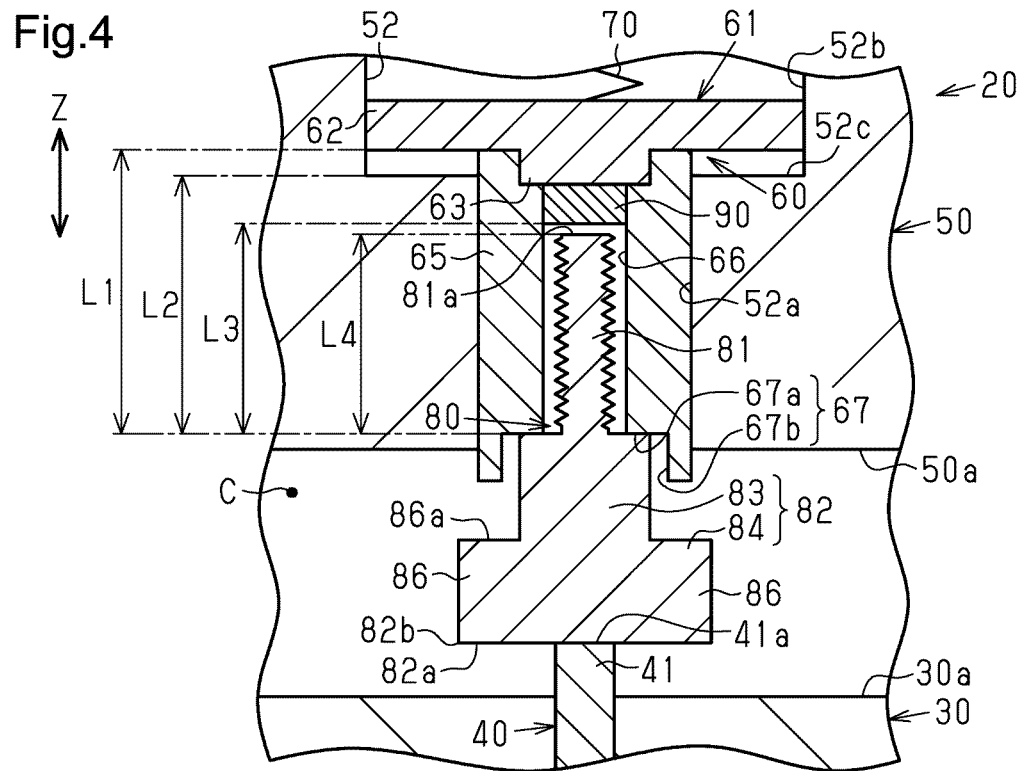
FIG. 4 is an enlarged cross-sectional view showing a main part of the manufacturing apparatus of FIG. 3.

As shown in FIG. 4, the step 67 includes a contact surface 67a that is located around the opening of the insertion hole 66 and extends outward, and includes a protrusion 67b that extends downward from the contact surface 67a. The contact surface 67a of the step 67 is in contact with the head 82 of the bolt 80. In the present embodiment, the step 67 is in contact with the first head portion 83. The contact of the cylindrical portion 65 with the head 82 divides the interior of the cylindrical portion 65 from the cavity C. The protrusion 67b covers a peripheral wall of the end of the head 82 closer to the shaft 81. There is a gap between the protrusion 67b and the head 82 in the radial direction of the cylindrical portion 65. The length between the contact surface 67a of the cylindrical portion 65 and the lower surface of the body 62 of the base 61 in the vertical direction Z is defined as length L1. With the bolt 80 in contact with the contact surface 67a, the length between the end of the shaft 81 closer to the head 82 and the step 52c is defined as length L2. Length L2 is shorter than length L1.

The facing surface 86a of the outer portion 86, which is a portion of the head 82 of the bolt 80 located outward from a portion in contact with the step 67, is separated from the second molding surface 50a in the vertical direction Z.

The biasing member 70 is located in the accommodating recess 52 and biases the holding portion 60 toward the first molding surface 30a. The biasing member 70 is, for example, a coil spring.

A magnet 90 is disposed in the insertion hole 66. The magnet 90 is attracted to the protrusion 63 of the base 61. With the bolt 80 inserted into the insertion hole 66, the magnet 90 is adjacent to a second end surface 81a of the bolt 80 on the side opposite to the first end surface 82a. With the bolt 80 in contact with the contact surface 67a, the length between the contact surface 67a of the cylindrical portion 65 and the lower surface of the magnet 90 in the vertical direction Z is defined as length L3. Length L3 is greater than or equal to length L4 of the shaft 81 in the vertical direction Z. Preferably, there is a gap between the magnet 90 and the second end surface 81a of the bolt 80. The magnet 90 magnetizes the cylindrical portion 65 and attracts the bolt 80 to the cylindrical portion 65.

Lower Mold 30

As shown in FIG. 3, the lower mold 30 includes a lower mold body 31 and a pin 40. The lower mold body 31 has a through-hole 32 that extends through the lower mold body 31 in the vertical direction Z. The through-hole 32 is located at a position overlapping the bolt 80 of the resin molded product 10 in the vertical direction Z.

The through-hole 32 includes an insertion portion 33 and a step 34. The insertion portion 33 extends in the vertical direction Z. The step 34 includes a contact surface 34a that is located around the lower opening of the through-hole 32, and a larger-diameter portion 34*b* that extends downward from the contact surface 34*a*. The contact surface 34*a* extends outward from the through-hole 32.

The pin 40 includes a shaft 43 and a cylindrical larger-diameter portion 44. The larger-diameter portion 44 is coupled to the lower end of the shaft 43 and extends outward from the shaft 43 in the radial direction of the shaft 43. The pin 40 is fitted into the through-hole 32. Upward movement of the pin 40 is restricted by the contact between the larger-diameter portion 44 and the contact surface 34*a* of the step 34.

As shown in FIG. 4, the pin 40 includes a protrusion 41 that protrudes from the first molding surface 30*a* toward the second molding surface 50*a*. The protrusion 41 is a portion of the pin 40 that protrudes upward from the first molding surface 30*a*. The protrusion 41 holds the bolt 80 with the holding portion 60. The protrusion 41 includes an end surface 41*a* that is in contact with part of the first end surface 82*a* of the bolt 80. That is, the first end surface 82*a* of the bolt 80 has a portion that is not in contact with the end surface 41*a*. The entirety of the end surface 41*a* is preferably in contact with a portion of the first end surface 82*a* of the bolt 80 located inward from the outer edge 82*b*.

The area of the end surface 41*a* is set such that the force with which the first end surface 82*a* of the bolt 80 is pressed upward by filling pressure is smaller than the sum of the force with which the surface of the head 82 of the bolt 80 on the side opposite to the first end surface 82*a* is pressed downward by filling pressure and the biasing force of the biasing member 70.

The steps for manufacturing the case 11 will now be described with reference to FIGS. 5 and 6.

Figure 5:
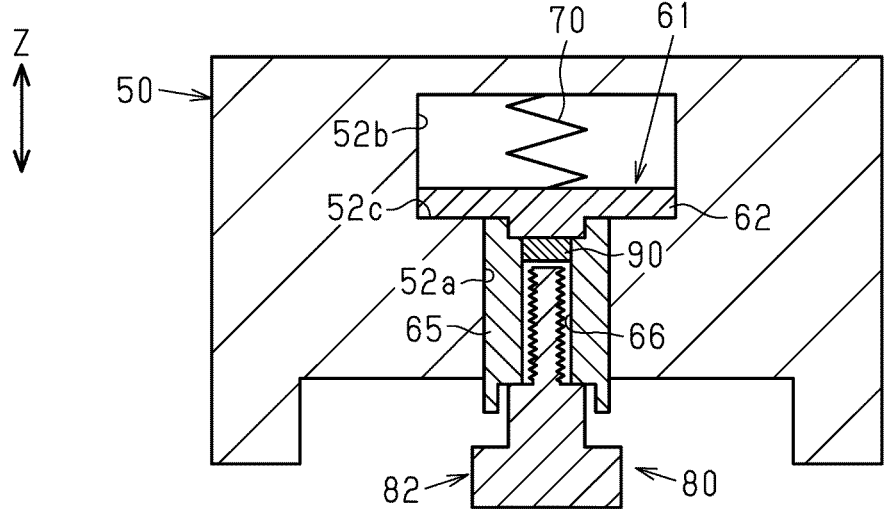
FIG. 5 is a cross-sectional view showing a state in which the bolt is retained by the upper mold.

As shown in FIG. 5, first, the bolt 80 is inserted into the insertion hole 66 of the upper mold 50. The head 82 of the bolt 80 is attracted to the cylindrical portion 65 that is magnetized by the magnet 90. Thus, the bolt 80 comes into contact with the cylindrical portion 65 and is retained by the upper mold 50.

Figure 6:
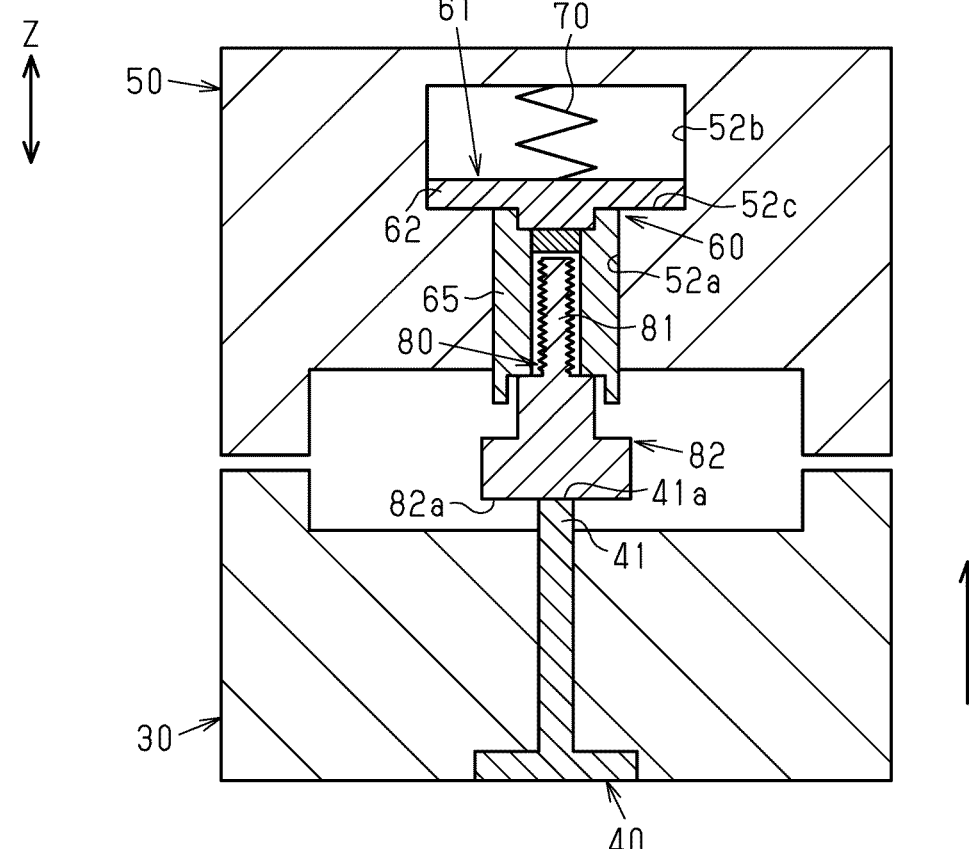
FIG. 6 is a cross-sectional view showing a state in which the lower mold is in contact with the bolt.

Next, as indicated by the arrow in FIG. 6, the lower mold 30 is moved toward the upper mold 50 so that the end surface 41*a* of the protrusion 41 comes into contact with the first end surface 82*a* of the bolt 80. Further movement of the lower mold 30 toward the upper mold 50 causes the holding portion 60 to be pushed up by the bolt 80. Thus, the holding portion 60 moves upward against the biasing force of the biasing member 70.

Next, as shown in FIG. 3, the upper mold 50 and the lower mold 30 are clamped so that the bolt 80 is held and fixed between the upper mold 50 and the lower mold 30. In this state, the first end surface 82*a* of the bolt 80 is positioned by the protrusion 41. Then, the cavity C is filled with resin from a gate (not shown) to form the resin molded product 10.

The operation of the present embodiment will now be described.

As shown in FIG. 3, the biasing member 70 biases and moves the holding portion 60 so that the bolt 80 is held between the protrusion 41 and the holding portion 60. This allows the bolt 80 to be pressed against the protrusion 41 even when the dimension of the bolt 80 varies.

As shown in FIG. 4, when the cavity C is filled with resin, a portion of the first end surface 82*a* of the bolt 80 that does not overlap the end surface 41*a* of the protrusion 41 is covered with the resin. This limits the removal of the bolt 80 from the resin molded product 10 toward the first end surface 82*a* after molding. The protrusion 41 is in contact with the first end surface 82*a* of the bolt 80. If the thickness of the resin is relatively thin, it becomes difficult to achieve the above effect; however, the distance between the first molding surface 30*a* and the first end surface 82*a* of the bolt 80 is likely to be consistent. Thus, the thickness of the resin covering the first end surface 82*a* of the bolt 80 is likely to be constant even if the dimension of the bolt 80 varies.

The advantages of the present embodiment will now be described.

(1) The lower mold 30 includes the protrusion 41. The protrusion 41 protrudes from the first molding surface 30*a* toward the second molding surface 50*a*. The protrusion 41 includes the end surface 41*a*, which is configured to come into contact with part of the first end surface 82*a* of the bolt 80. The upper mold 50 includes the holding portion 60 and the biasing member 70. The holding portion 60 is located in the accommodating recess 52 and configured to hold the bolt 80 with the protrusion 41. The biasing member 70 is located in the accommodating recess 52, and biases the holding portion 60 toward the first molding surface 30*a*.

In such a configuration, since the above effect is produced, the removal of the bolt 80 from the resin molded product 10 toward the first end surface 82*a* is limited after molding.

(2) The entirety of the end surface 41*a* is in contact with the portion of the first end surface 82*a* of the bolt 80 located inward from the outer edge 82*b*.

In such a configuration, when the cavity C is filled with resin, the entire outer edge 82*b* of the first end surface 82*a* of the bolt 80 is covered with the resin. Thus, the removal of the bolt 80 from the resin molded product 10 toward the first end surface 82*a* is further limited after molding.

(3) The cylindrical portion 65 includes the contact surface 67*a*, which divides the interior of the cylindrical portion 65 from the cavity C by coming into contact with the head 82.

In such a configuration, the head 82 of the bolt 80 is held between the protrusion 41 and the holding portion 60. In this state, the contact of the contact surface 67*a* with the head 82 allows the interior of the insertion hole 66 to be divided from the cavity C by the holding portion 60. Thus, with the shaft 81 inserted into the insertion hole 66, the insertion hole 66 is prevented from being filled with resin.

(4) The second molding surface 50*a* is separated from the facing surface 86*a* in the vertical direction Z.

In such a configuration, resin is filled in the space between the facing surface 86*a* of the outer portion 86 and the second molding surface 50*a*. Thus, the outer portion 86 of the bolt 80 is held between the resin filled in the space between the first end surface 82*a* of the outer portion 86 and the first molding surface 30*a* and the resin filled in the space between the outer portion 86 and the second molding surface 50*a*. This limits the removal of the bolt 80 from the resin molded product 10.

(5) The head 82 of the bolt 80 is a magnetic body. The cylindrical portion 65 is a ferromagnetic body.

In such a configuration, when the bolt 80 is attracted to the holding portion 60 magnetized by the magnet 90, the bolt 80 is retained in the insertion hole 66 of the upper mold 50 and the first end surface 82*a* of the bolt 80 is positioned. This stabilizes the position and orientation of the bolt 80. Accordingly, the bolt 80 in the resin molded product 10 is prevented from being displaced.

Modifications

The present embodiment may be modified as follows. The present embodiment and the following modifications can be combined as long as they remain technically consistent with each other.

In the present embodiment, the bolt 80 is retained by the upper mold 50 by attracting the bolt 80 to the cylindrical portion 65. Instead, for example, the upper mold 50 may include two arms that extend from the second molding surface 50*a* and hold the head 82 of the bolt 80 from the opposite sides in the radial direction of the shaft 81. In this case, the two arms retain the bolt 80 that is inserted into the insertion hole 66.

In the present embodiment, the lower mold 30 is used as the first mold and the upper mold 50 is used as the second mold. Instead, the lower mold 30 may be used as the second mold and the upper mold 50 may be used as the first mold.

In the present embodiment, the interior of the cylindrical portion 65 is divided from the cavity C by the contact surface 67*a*. However, the contact surface 67*a* may be omitted if there is no gap between the inner surface of the cylindrical portion 65 and the shaft 81.

In the present embodiment, the bolt 80 includes the first head portion 83 and the second head portion 84. Instead, the bolt 80 may include a head having a plate shape in plan view and extending from the end of the shaft 81 in the radial direction of the shaft 81. Even in this case, the cylindrical portion 65 only needs to divide the interior of the cylindrical portion 65 from the cavity C by coming into contact with the head.

In the present embodiment, the entirety of the end surface 41*a* of the pin 40 is in contact with the portion of the first end surface 82*a* of the bolt 80 located inward from the outer edge 82*b*. However, this configuration does not have to be employed. A portion of the end surface 41*a* of the pin 40 does not have to overlap the first end surface 82*a* of the bolt 80.

The apparatus for manufacturing a resin molded product is not limited to the apparatus for manufacturing a gearbox with a motor. In short, any manufacturing apparatus used to manufacture a resin molded product with an elongated member inserted may be provided. For example, it may be a manufacturing apparatus used to manufacture a resin molded product with a rod-shaped metal pipe inserted.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An apparatus for manufacturing a resin molded product into which a bolt is inserted, the apparatus comprising:
   a first mold having a first molding surface; and
   a second mold having a second molding surface that defines a cavity together with the first molding surface, wherein
   the first mold includes a protrusion that protrudes from the first molding surface toward the second molding surface, wherein the bolt includes a first end surface and a second end surface in a longitudinal direction, the protrusion includes an end surface configured to come into contact with part of the first end surface, and
   the second mold includes:
   an accommodating recess that opens toward the first molding surface;

a holding portion disposed in the accommodating recess and configured to hold the bolt with the protrusion; and
   a spring that is disposed in the accommodating recess and biases the holding portion toward the first molding surface, wherein
   the bolt is configured to extend from the end surface of the protrusion toward the spring such that the first end surface of the bolt is positioned within the cavity and the second end surface of the bolt is positioned inside the holding portion,
   the first mold is a lower mold disposed on a lower side in a gravitational direction,
   the second mold is an upper mold disposed on an upper side in the gravitational direction,
   the second end surface of the bolt is a magnetic body, and
   the holding portion includes a ferromagnetic body.

2. The apparatus according to claim 1, wherein
   an entirety of the end surface of the protrusion is in contact with a portion of the first end surface of the bolt located inward from an outer edge of the first end surface.

3. The apparatus according to claim 1, wherein
   the bolt includes:
   a shaft; and
   a head having the first end surface and extending outward from the shaft in a radial direction of the shaft,
   the holding portion includes a cylindrical portion configured such that the shaft is inserted into the cylindrical portion, and
   the cylindrical portion includes a contact surface that divides an interior of the cylindrical portion from the cavity by coming into contact with the head.

4. The apparatus according to claim 3, wherein
   the head includes an outer portion, the outer portion extending outward in the radial direction from a contact portion that is in contact with the contact surface and including a facing surface that faces the second molding surface, and
   the second molding surface is separated from the facing surface.

5. An apparatus for manufacturing a resin molded product, the apparatus being configured to manufacture a resin molded product into which an elongated member is inserted, the apparatus comprising:
   a first mold having a first molding surface; and
   a second mold having a second molding surface that defines a cavity together with the first molding surface, wherein
   the first mold includes a protrusion that protrudes from the first molding surface toward the second molding surface, wherein the elongated member includes a first end surface and a second end surface in a longitudinal direction, and the protrusion includes an end surface configured to come into contact with part of the first end surface, and
   the second mold includes:
   an accommodating recess that opens toward the first molding surface;
   a holding portion disposed in the accommodating recess and configured to hold the elongated member with the protrusion; and
   a spring that is disposed in the accommodating recess and biases the holding portion toward the first molding surface, wherein
   the elongated member includes:

a shaft; and a head having the first end surface and extending outward from the shaft in a radial direction of the shaft, the holding portion includes a cylindrical portion configured such that the shaft is inserted into the cylindrical portion, and the cylindrical portion includes a contact surface that divides an interior of the cylindrical portion from the cavity by coming into contact with the head, wherein the first mold is a lower mold disposed on a lower side in a gravitational direction, the second mold is an upper mold disposed on an upper side in the gravitational direction, the head of the elongated member is a magnetic body, and the cylindrical portion is a ferromagnetic body.

\* \* \* \* \*